July 26, 1927. 1,637,251
L. E. BAKER
LIQUID MEASURING AND DISPENSING APPARATUS
Filed Jan. 5, 1926    4 Sheets-Sheet 2
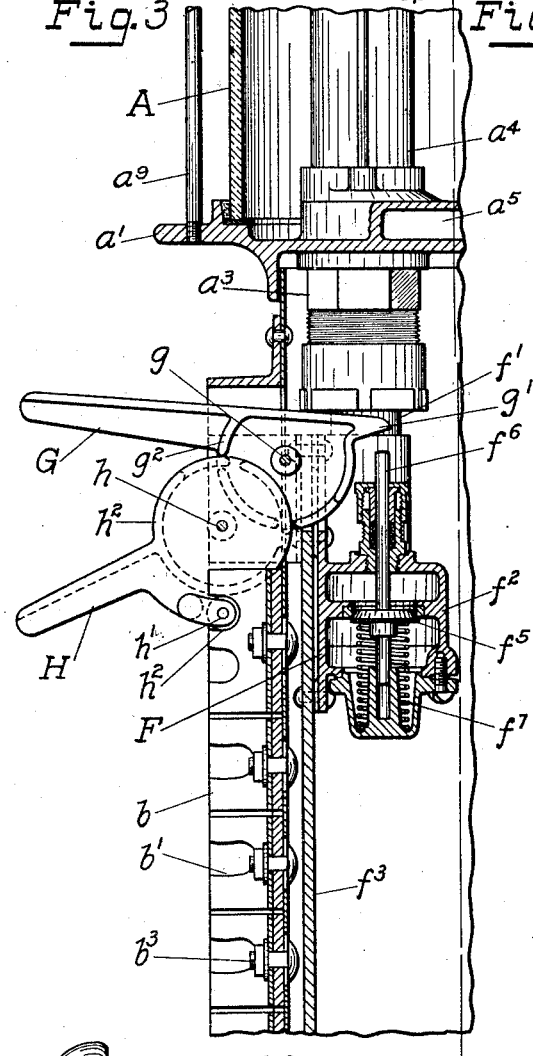
Fig. 3
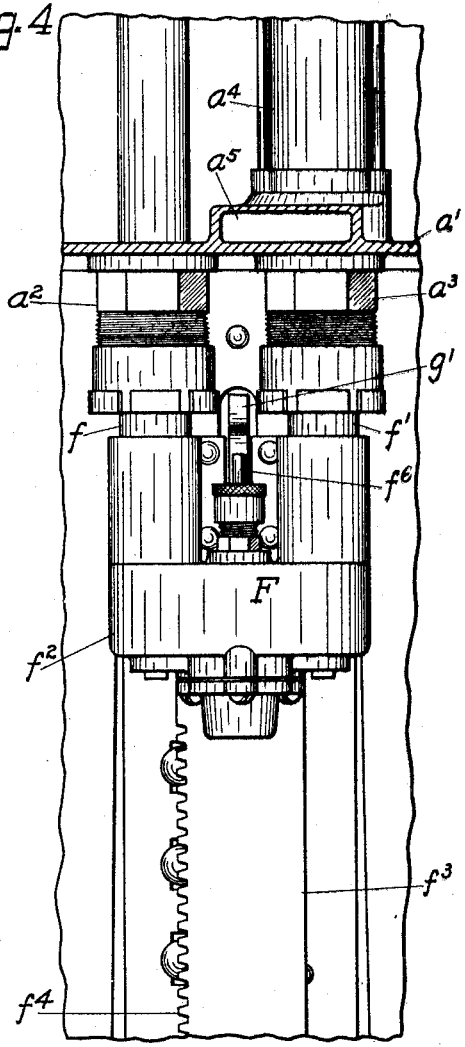
Fig. 4
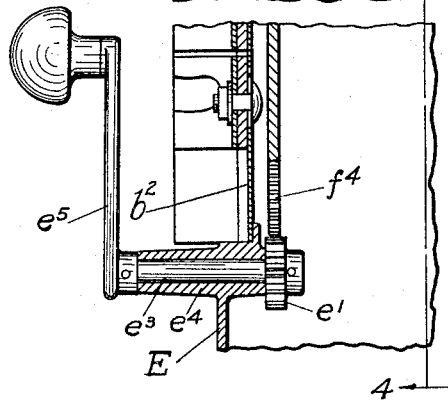
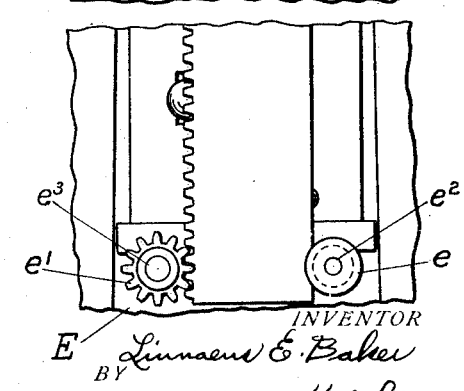
INVENTOR
Linnaeus E. Baker
BY Walter A. Knight
ATTORNEY

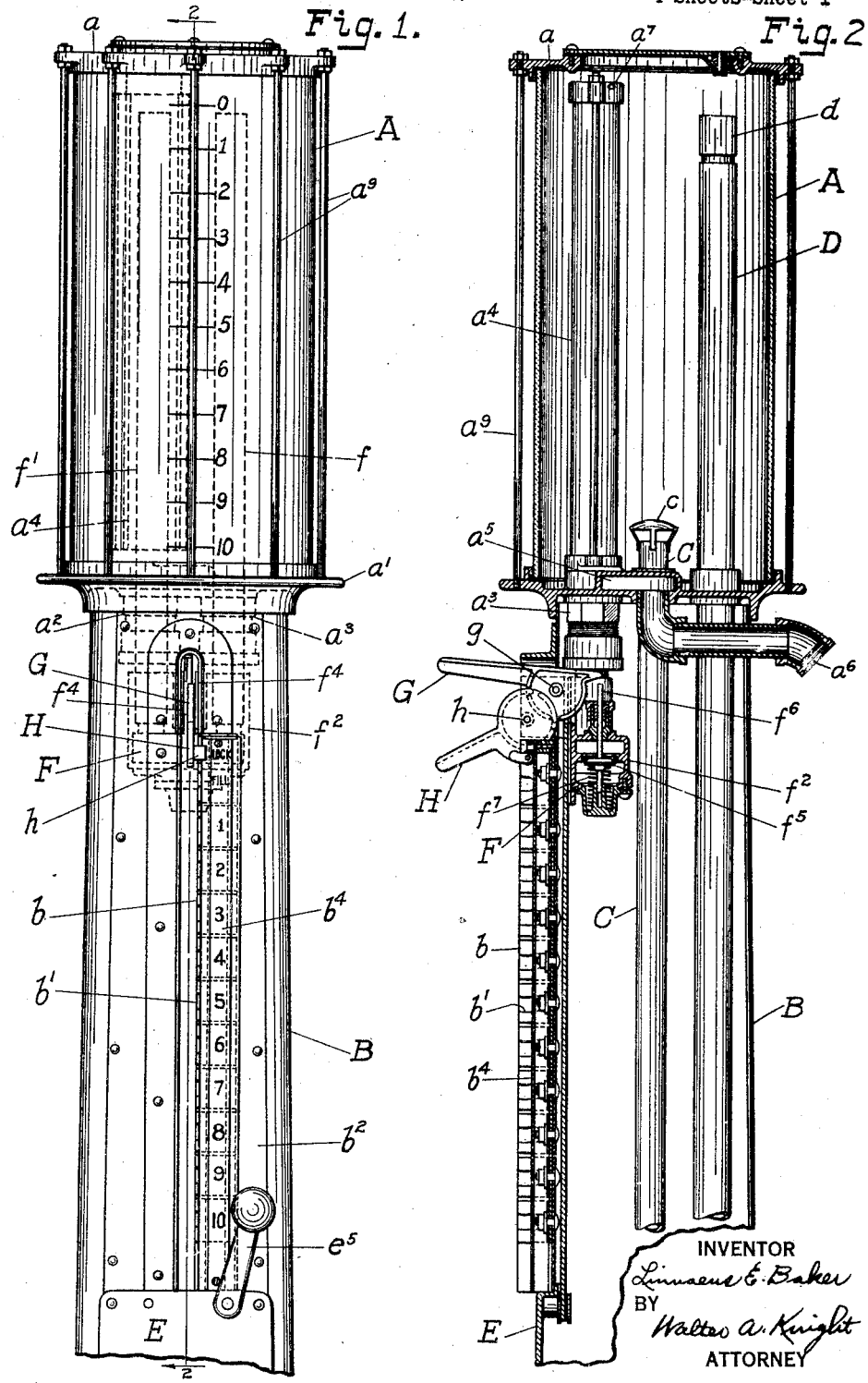

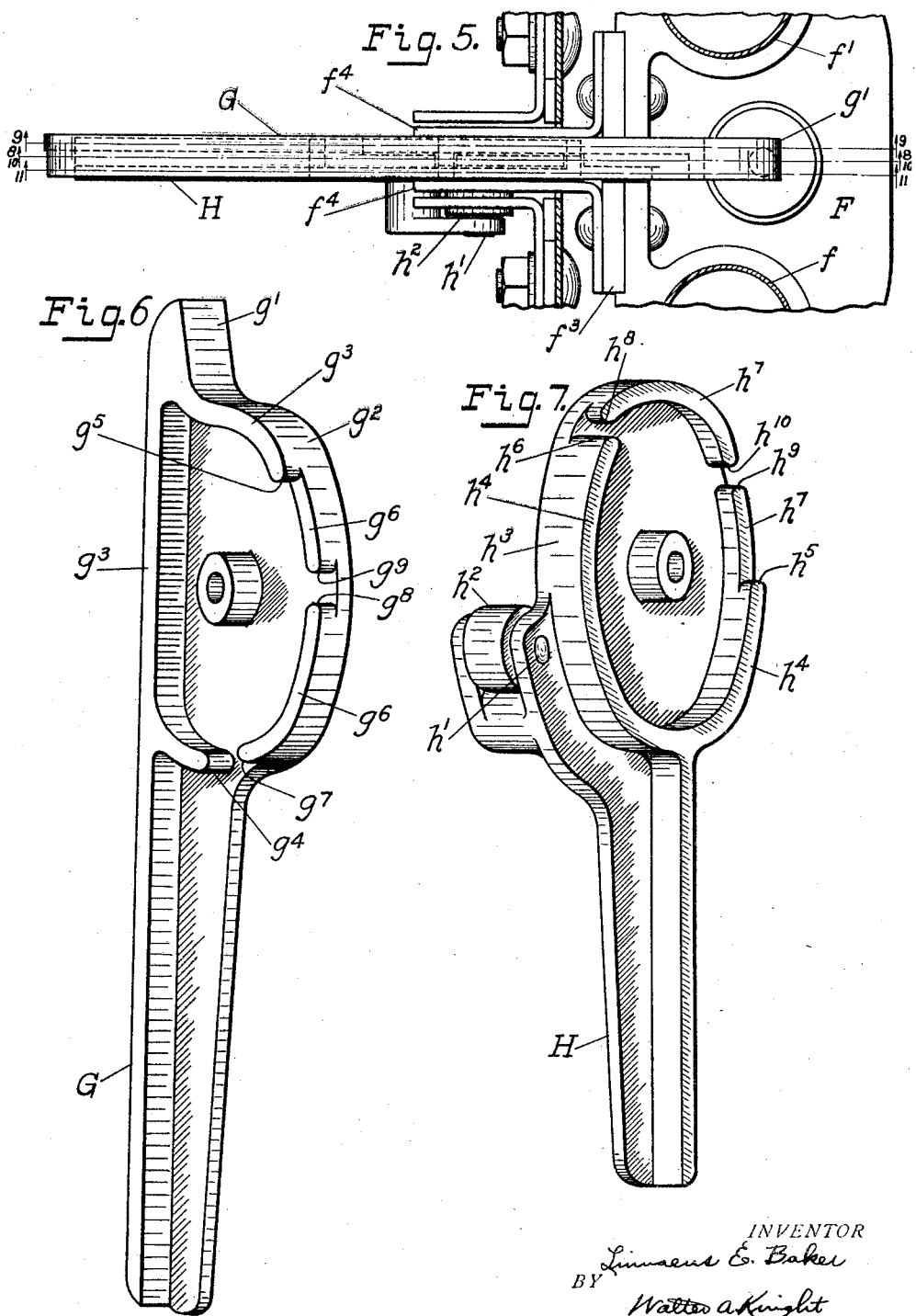

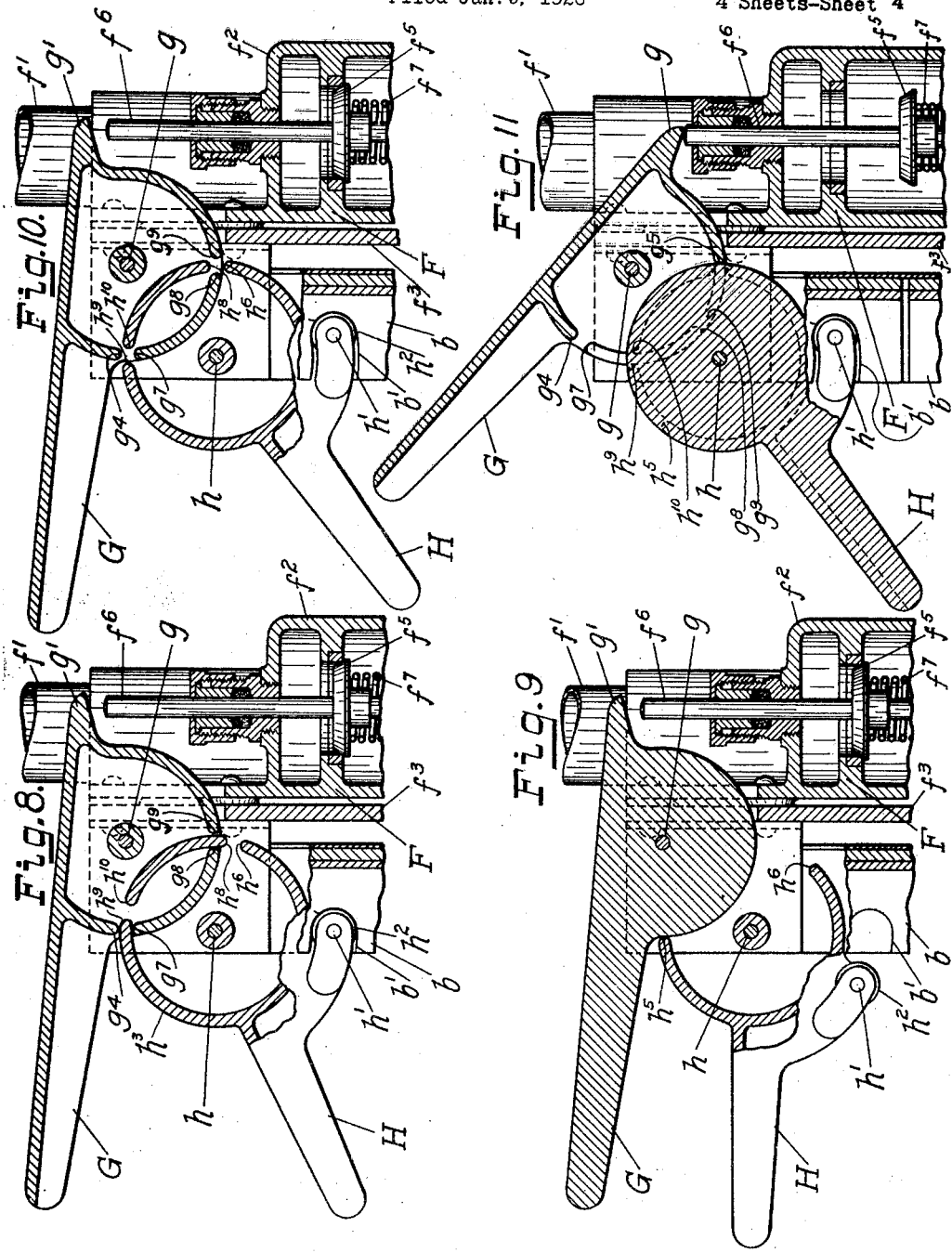

Patented July 26, 1927.

1,637,251

UNITED STATES PATENT OFFICE.

LINNAEUS E. BAKER, OF FORT WAYNE, INDIANA, ASSIGNOR TO WAYNE COMPANY, OF FORT WAYNE, INDIANA, A CORPORATION OF INDIANA.

LIQUID MEASURING AND DISPENSING APPARATUS.

Application filed January 5, 1926. Serial No. 79,338.

My invention relates to liquid measuring and dispensing apparatus of the so-called visible class used generally in selling gasoline and more particularly to the type in which accurate measurement is effected by the vertical setting of what is known as the "tube portion" of the gasoline conduit leading to the customer's tank, thereby changing the level to which the visible container may be automatically drained. The latter portion of said conduit is usually a hose terminating in a nozzle through which the customer's tank is filled.

To allow for error in judgment as to the proper setting to fill the customer's tank, a serve-valve is suitably located in said conduit to be closed in case said tank will not hold the amount set for. However, dishonest manipulation of the aforesaid adjustable-tube or of the serve-valve is a means of cheating the customer, and the main object of my invention is to provide interlocking mechanism which will protect the customer in this regard at all times.

My improvement has been applied to a particular arrangement of the aforesaid type of adjustable conduit consisting of a U-tube, as represented in the pending application for Letters Patent, filed by me July 24th 1924, serial No. 727,956.

The particular embodiment of my invention selected for illustration is shown in the accompanying drawings, in which—

Figure 1, is an elevation, representing the upper and central portions of a gasoline measuring and dispensing device bearing my improvements, Fig. 2 is a section on the line 2—2 of Fig. 1, Fig. 3 is an enlarged portion of Fig. 2, additionally showing the crank and pinion for manually shifting the adjustable part of the delivery conduit, Fig. 4 is a sectional elevation on the line 4—4 of Fig. 3 as though the apparatus were there shown in full, Fig. 5, a detail, is a top plan view of the serving-valve lever, the setting-lever and the adjacent parts, Fig. 6, a detail, is a perspective of the serve-valve lever, Fig. 7, a detail, is a perspective of the setting-lever, Fig. 8 is a section on the line 8—8 of Fig.
5, showing the setting-lever engaging the notch corresponding to either lock or fill positions and the serve-valve lever locked so that the serve-valve cannot be opened, Fig. 9 is a section on the line 9—9 of Fig. 5, with the setting-lever raised to clear all setting-notches for resetting. In this position the serve-valve is locked so that it cannot be manipulated to open the serve-valve, Fig. 10 is a section on the line 10—10 of Fig. 5, showing the setting-lever set for serving some particular quantity and the serve-valve lever free to open the serve-valve, and Fig. 11 is a section on the line 11—11 of Fig. 5, showing the setting-lever set for serving some particular quantity, as in Fig. 10, but with the serve-valve lever raised and the serve-valve open, permitting the liquid to gravitate to the customer's tank.

Referring now to the drawings, the elevated container, usual to such apparatuses, consists of the transparent glass cylinder A suitably clamped between the top head $a$ and bottom $a^1$ by means of tie-rods $a^9$. To indicate the liquid level therein, the container is usually provided with graduations or markers. The bottom $a^1$ is secured to the top end of a column B extending upwardly from the base (not shown). Gasoline is forced from the storage tank (not shown) by any suitable means (not shown) through the fill pipe C into the container A. A deflector $c$ is placed in the container A on the end of the fill pipe C to prevent agitation of the liquid in filling. D is a pipe which returns excess liquid to the source of supply, its upper end $d$ being set at the zero graduation of the container A and determines accurately the initial level.

Through the container bottom $a^1$ extend the two parallel upright branches of the U-tube F. These branches preferably terminate above at substantially the same height. One of these branches $f$ is the inlet end of the U-tube, extending through a stuffing box $a^2$ up into the container A, and is open-ended at the top to allow liquid to flow into it from the contents of the container. The other branch $f^1$ is the outlet end of the U-tube, is open-ended and extends through a stuffing box $a^3$ up into the container A, within a leak-tight chamber formed by the casing $a^4$ with which it telescopes. These branches $f$ and $f^1$ terminate below the stuffing boxes $a^2$, $a^3$ in a connecting member $f^2$, which forms the bottom of the U-tube, and with the branches $f$, $f^1$ forms a continuous conduit for the flow of liquid from the container A down through the tube $f$, over through the connecting member $f^2$, up through the tube $f^1$, out into the chamber $a^4$ whence it passes through the annular space formed by the inner wall of $a^4$ and the outer wall $f^1$, through the cored passage $a^5$ to the discharge outlet $a^6$, with which the serving-hose, not shown, is connected.

A vent hole $a^7$ is provided in the top of the chamber $a^4$ to maintain atmospheric pressure at all times in the air spaces in the tops of the container A and the casing $a^4$ to insure the U-tube element always remaining full of gasoline.

To the bottom of connecting member $f^2$ is secured a guide bar $f^3$ parallel with the tubes $f$ and $f^1$. The bar is guided by the sheave wheel $e$ and the gear $e^1$. Sheave wheel $e$ turns on the stud $e^2$ of the gear plate E. A shaft $e^3$ is journaled in a boss $e^4$ of the gear plate E. To opposite ends of said shaft $e^3$ are keyed said gear $e^1$ and a crank $e^5$. Said gear plate E is mounted on the column B. The gear $e^1$ engages rack teeth $f^4$ of the guide bar $f^3$ and by manual operation of the crank $e^5$ the guide bar $f^3$ may be shifted, thus elevating or lowering the U-tube F as desired.

A valve $f^5$ in the connecting member $f^2$ keeps the passage between the lower ends of the tubes $f$ and $f^1$ normally closed, due to the spring $f^7$. The valve $f^5$ may be opened by raising the serve-lever G which is pivoted at $g$ in angle brackets $f^4$, $f^4$ secured to the connecting member $f^2$ of the U-tube F, its opposite end $g^1$ depressing the stem $f^6$ of the valve $f^5$.

A series of adjustable stops $b$, containing notches $b^1$, are mounted in a plate $b^2$ secured to the front of the column B.

The location of these stops and the corresponding notches determines accurately the elevation of the U-tube and thereby the amount of liquid which any particular setting will deliver.

The setting-lever H is journaled at $h$ in aforesaid angle brackets $f^4$, $f^4$.

Suitably pivoted at $h^1$ in the setting-lever H is a roller $h^2$ which may enter the appropriate notch $b^1$ by depressing lever H when the U-tube has been brought to the desired level by manually turning the crank $e^5$.

These stops $b$ may be vertically adjusted, then secured to the plate $b^2$ by means of bolts $b^3$, and sealed in any suitable manner as by scale plate $b^4$.

Serve-lever G has an arcuate boss $g^2$ concentric with its pivot $g$ and setting-lever H has an arcuate boss $h^3$ concentric with its pivot $h$, and these bosses are on the contiguous faces of said levers, and have notches providing for the interlocking or rotation of said levers in certain positions as will be hereinafter described.

The boss $g^2$ has its different parts of different heights. The part of full height, that is terminating on plane $g^3$ extends from $g^4$ to the left (Fig. 6) to $g^5$. The part terminating on the lower plane $g^6$ extends from $g^7$ to the right (Fig. 6) to $g^5$, except where the boss is cut away entirely between $g^8$ and $g^9$. The boss $g^2$ is also cut away entirely between $g^4$ and $g^7$.

The boss $h^3$ has its different parts of different heights. The part of full height, that is terminating on plane $h^4$, extends from $h^5$ to the left (Fig. 7) to $h^6$. The part terminating on the lower plane $h^7$ extends from $h^5$ to the right (Fig. 7) to $h^8$, except where the boss is cut away entirely between $h^9$ and $h^{10}$. The boss $h^3$ is also cut away entirely between $h^6$ and $h^8$.

The apparatus is operated in the following manner:

When locked up for the night the visible container A is empty and the roller $h^2$ in the notch $b^1$ opposite the mark "Lock" on the scale $b^4$. It will be noted that the "lock" and "fill" notches are shallower than the others, as it is not intended that gasoline shall be served in either of those positions, so provision is made that the serve-valve can not be opened when the roller is in either of these notches.

The setting lever H is now raised enough to withdraw the roller from the "lock" notch. The U-tube is then lowered by rotation of the crank $e^5$ until the roller $h^2$ is opposite the "fill" notch, when the lever H is depressed, the roller entering the notch. The visible container is then filled and the excess above the zero graduation drained back through the overflow tube D to the source of supply. Levers G and H are now in the position shown in Fig. 8.

Suppose the customer asks for five gallons of gasoline. The operator raises setting-lever H withdrawing the roller from the fill-notch. Levers G and H are then in the positions shown in Fig. 9, in which position the serve-valve $f^5$ can not be opened. He then rotates the crank $e^5$ until the roller is opposite "5" on the scale. He then depresses the lever and the roller enters the notch $b^1$ opposite the "5" and presses the roller to the bottom of the notch.

Levers G and H are now in the positions shown in Fig. 10, that is ready to serve.

The operator now raises the serve lever G as shown in Fig. 11, opening the valve $f^5$ and allowing gasoline to flow out of the visible container A into the customer's car tank until five gallons have been served, when the flow ceases.

The serve lever G must then be released when it will be depressed by the combined action of spring $f^7$ and gravity, to the position shown in Fig. 10. The setting latch can then be lowered for further serving or raised to fill or lock positions.

If a customer should over estimate the capacity of his car tank and it should overflow while being served, the operator lets go the serve-lever G and the valve $f^5$ instantly closes. In short the serve-valve stays open only so long as the operator maintains upward pressure on the serve-lever G sufficient to depress the spring $f^7$.

The effect of the interlocking of the bosses $g^2$ and $h^3$ has been above described. What actually takes place is that in the position of the levers G and H shown in Fig. 8 the slot between $g^4$ and $g^7$ is occupied by a portion of boss $h^3$ on the lever $h^7$ just to the right of the slot $h^9$, $h^{10}$ (Fig. 7); and at the same time portion of the boss between $h^8$ and $h^{10}$ occupies the slot between $g^8$ and $g^9$.

In the positions of the levers shown in Fig. 9, the point $h^5$ has impinged upon the web of the lever G from which the boss $g^2$ rises opposite the opening in the boss between $g^4$ and $g^7$. In this position the roller $h^2$ is clear of the notches $b^1$, and the U-tube can then be raised or lowered.

In the position of the levers shown in Fig. 10, the slot between $g^4$ and $g^7$ registers with the slot between $h^9$ and $h^{10}$ and the slot between $g^8$ and $g^9$ registers with the slot between $h^6$ and $h^8$; the serve lever G can now be raised and the serve valve $f^5$ opened.

In Fig. 11 the serve valve has been opened and the boss section between $g^7$ and $g^8$ occupies the slot between $h^9$ and $h^{10}$ and also the boss section between $g^9$ and $g^5$ occupies the slot between $h^6$ and $h^8$, preventing withdrawal of the roller $h^2$ from notch $b^1$.

In other words, with this apparatus it is impossible to serve until the operator has set for a definite quantity, and it is impossible to change the setting while serving.

Many changes can be made in the mechanism herein shown without departing from the spirit of my invention. It is, therefore, not my intention to be limited to the apparatus herein shown but I claim as within the scope of my invention all modifications thereof readable upon the claims.

I claim as my invention and desire to secure by Letters Patent of the United States:—

1. In combination with a liquid measuring and dispensing apparatus having an elevated container, means for supplying liquid to said container, a vertically slidable serve-tube whose upper end communicated with said container, stop means for setting the vertical height of said serve-tube from time to time before serving liquid from said container, and a serve-valve to control the flow of liquid dispensed; a lever to control said setting-means, a lever to open said serve-valve, and co-acting means on said levers adapted to so interlock them that the lever which opens the serve-valve can function only when the setting-means is set in a position to serve liquid and so that when in this position and the serve-valve open the setting-lever can not be shifted to change the position of the setting-means.

2. In combination with a liquid measuring and dispensing apparatus having an elevated container, means for supplying liquid to said container, a vertically slidable serve-tube whose upper end communicated with said container, stop means for setting the vertical height of said serve-tube from time to time before serving liquid from said container, and a serve-valve to control the flow of liquid dispensed; a lever to control said setting-means, a lever to open said serve-valve, an arcuate boss on said setting-lever, an arcuate boss on said serve-lever, said bosses contiguous and varying in height in different sections thereof and gaps in said bosses so arranged that said bosses will cause said levers to interlock so that the serve-lever can function to open the valve only when the setting-means is set in one of the positions for serving liquid, and so that when in a set position and the serve-valve open the setting-lever can not be shifted to change the position of the setting-means.

3. A liquid measuring and dispensing apparatus having in combination, an elevated container, means for supplying liquid to said container, a vertically slidable serve-tube whose upper end connects with said container, a series of depressions for setting the vertical height of said serve-tube, a setting-lever with a detent adapted to enter the one of said depressions opposite which it is stopped, a serve-valve to control the flow of liquid dispensed, a lever to open said serve-valve and co-acting means on said levers adapted to so interlock them that the lever which opens the serve-valve can function only when the setting-lever is set in a position to serve liquid and so that when in this position and the serve-valve open the setting-lever cannot be shifted to change the position of the serve-tube.

4. A liquid measuring and dispensing apparatus having in combination, an elevated container, means for supplying liquid to said container, a vertically slidable serve-tube whose upper end communicates with said container, a series of depressions for setting the vertical height of said serve-tube, a setting-lever with a detent adapted to enter one of said depressions opposite which it is stopped, a serve-valve to control the flow of liquid dispensed, a lever to open said serve-valve, an arcuate boss on said setting-lever, an arcuate boss on said serve-lever, said bosses contiguous and varying in height in different sections thereof and gaps in said bosses so arranged that said bosses will cause said levers to interlock so that the serve-lever can function to open the valve only when the setting lever is set in one of the positions for serving liquid, and so that when in set position and the serve-valve open the setting-lever cannot be shifted to change the position of the setting-means.

In testimony whereof I have hereunto set my hand.

LINNAEUS E. BAKER.